(12) United States Patent
Schnitzer

(10) Patent No.: US 9,022,427 B2
(45) Date of Patent: May 5, 2015

(54) STEERING SHAFT BEARING UNIT

(75) Inventor: Rony Schnitzer, Ruggell (LI)

(73) Assignee: Thyssenkrupp Presta Aktiengeesllscahft, Eschen (LI)

( * ) Notice: Subject to any disclaimer, the term of this patent is extended or adjusted under 35 U.S.C. 154(b) by 0 days.

(21) Appl. No.: 14/352,839

(22) PCT Filed: Sep. 12, 2012

(86) PCT No.: PCT/EP2012/003820
§ 371 (c)(1),
(2), (4) Date: Jul. 1, 2014

(87) PCT Pub. No.: WO2013/056771
PCT Pub. Date: Apr. 25, 2013

(65) Prior Publication Data
US 2014/0346761 A1 Nov. 27, 2014

(30) Foreign Application Priority Data
Oct. 19, 2011 (DE) .......................... 10 2011 054 597

(51) Int. Cl.
| B62D 1/184 | (2006.01) |
|---|---|
| B62D 1/185 | (2006.01) |
| F16C 35/00 | (2006.01) |
| B62D 1/16 | (2006.01) |
| B23K 31/02 | (2006.01) |

(Continued)

(52) U.S. Cl.
CPC ........... *F16C 35/00* (2013.01); *Y10T 29/49636* (2015.01); *B62D 1/184* (2013.01); *B62D 1/16* (2013.01); *B62D 1/185* (2013.01); *B23K 31/027* (2013.01); *B62D 65/02* (2013.01); *F16C 2326/24* (2013.01); *F16M 13/02* (2013.01)

(58) Field of Classification Search
CPC ......... B62D 1/184; B62D 1/185; B62D 1/187
USPC ............................................ 280/775; 74/493
See application file for complete search history.

(56) References Cited

U.S. PATENT DOCUMENTS

| 5,239,888 A | 8/1993 | Sevault et al. |
|---|---|---|
| 5,377,555 A | 1/1995 | Hancock |
| 5,730,465 A | 3/1998 | Barton et al. |

(Continued)

FOREIGN PATENT DOCUMENTS

| DE | 696 02 206 | 11/1999 |
|---|---|---|
| DE | 603 00 128 | 4/2005 |

(Continued)

OTHER PUBLICATIONS

International Search Report (ISR) issued Dec. 20, 2012 in International (PCT) Application No. PCT/EP2012/003820.

*Primary Examiner* — Ruth Ilan
(74) *Attorney, Agent, or Firm* — Wenderoth, Lind & Ponack, LLP.

(57) ABSTRACT

A steering shaft bearing unit for rotatably mounting a steering shaft of a steering column for a motor vehicle includes an outer metal sheet having at least one circumferentially closed region for accommodating at least one bearing for rotatably mounting the steering shaft, and at least one securing region for securing the steering shaft bearing unit to a console part of the steering column. In the securing region, the outer metal sheet has an opening delimited by at least two opposite securing flanges which project freely from the outer metal sheet and which are part thereof.

19 Claims, 6 Drawing Sheets

(51) Int. Cl.
*B62D 65/02* (2006.01)
*F16M 13/02* (2006.01)

(56) References Cited

U.S. PATENT DOCUMENTS

| | | | |
|---|---|---|---|
| 5,927,152 | A | 7/1999 | Marzio et al. |
| 7,350,813 | B2 | 4/2008 | Inoue |
| 7,607,694 | B2 | 10/2009 | Shinohara et al. |
| 7,735,391 | B2 | 6/2010 | Osawa et al. |
| 7,861,615 | B2 * | 1/2011 | Harris et al. ............ 74/493 |
| 7,918,483 | B2 | 4/2011 | Galehr et al. |
| 8,616,580 | B2 | 12/2013 | Maniwa et al. |
| 2002/0084644 | A1 | 7/2002 | Rinker et al. |
| 2002/0178857 | A1 | 12/2002 | Matsumiya |
| 2005/0016315 | A1 | 1/2005 | Breuss et al. |
| 2006/0151984 | A1 | 7/2006 | Higashino et al. |
| 2007/0069513 | A1 | 3/2007 | Kirihara et al. |
| 2008/0178702 | A1 | 7/2008 | Lutz |
| 2008/0252056 | A1 | 10/2008 | Moriyama et al. |
| 2008/0290641 | A1 * | 11/2008 | Galehr et al. ............ 280/775 |
| 2009/0044656 | A1 | 2/2009 | Okada et al. |
| 2010/0018340 | A1 * | 1/2010 | Schnitzer et al. ........ 74/493 |
| 2010/0282016 | A1 | 11/2010 | Oehri et al. |
| 2010/0294072 | A1 | 11/2010 | Ishii et al. |
| 2011/0259140 | A1 | 10/2011 | Fevre |
| 2012/0297917 | A1 | 11/2012 | Mashimo et al. |

FOREIGN PATENT DOCUMENTS

| | | |
|---|---|---|
| DE | 11 2009 000 027 | 8/2010 |
| EP | 0 502 761 | 9/1992 |
| EP | 0 600 700 | 6/1994 |
| EP | 0 770 537 | 5/1997 |
| EP | 1 125 820 | 8/2001 |
| EP | 0 794 103 | 10/2002 |
| EP | 1 359 082 | 11/2003 |
| EP | 1 535 824 | 6/2005 |
| EP | 1 547 902 | 6/2005 |
| EP | 1 553 002 | 7/2005 |
| FR | 2 729 361 | 7/1996 |
| GB | 2 431 980 | 5/2007 |
| JP | 10-7003 | 1/1998 |
| JP | 2002-302046 | 10/2002 |
| JP | 2004-161276 | 6/2004 |
| JP | 2004-196299 | 7/2004 |
| JP | 2010-234907 | 10/2010 |
| JP | 2011-25859 | 2/2011 |
| KR | 10-2012-0042328 | 5/2012 |
| WO | 01/81149 | 11/2001 |
| WO | 2007/026114 | 3/2007 |
| WO | 2009/121386 | 10/2009 |
| WO | 2009/138578 | 11/2009 |
| WO | 2011/070950 | 6/2011 |
| WO | 2013/056764 | 4/2013 |
| WO | 2013/056765 | 4/2013 |
| WO | 2013/056766 | 4/2013 |

* cited by examiner

STEERING SHAFT BEARING UNIT

BACKGROUND OF THE INVENTION

The present invention relates to a steering shaft bearing unit for the rotatable support of a steering shaft of a steering column for a motor vehicle. The steering shaft bearing unit comprises a jacket metal sheet which comprises at least one circumferentially closed region for receiving at least one bearing for the rotatable support of the steering shaft and at least one securement region for securing in position the steering shaft bearing unit on a bracket part of the steering column.

The invention further relates also to a steering column comprising such a steering shaft bearing unit as well as several methods for the production of the steering shaft bearing unit.

EP 1 535 824 B1, EP 1 547 902 A1, EP 1 553 002 B1, U.S. Pat. No. 7,350,813 B2 and JP 10-7003 disclose generic steering shaft bearing units, all of which have in common that the steering shaft bearing unit is widened in the securement region in order to provide suitable securement areas for securing in position the steering shaft bearing unit on a bracket part and therewith on a motor vehicle body. The widening of the jacket metal sheet in the securement region entails two significant disadvantages. For one, the widening leads to a thinning-out and therewith to a weakening of the jacket metal sheet in this region. For another, the process of widening the jacket metal sheet is tied to increased technical expenditures.

SUMMARY OF THE INVENTION

The invention therefore addresses the problem of providing a generic steering shaft bearing unit which can be produced as simply and as cost-effectively as feasible and yet meets high demands made of its rigidity.

This is attained according to the invention through a steering shaft bearing unit as described below.

It is consequently provided that the jacket metal sheet comprises in its securement region an opening delimited by at least two opposing, freely projecting securement webs, wherein the securement webs are part of the jacket metal sheet.

In this context, it is advantageous for the securement webs to project, preferably outwardly, beyond their adjacent regions of the jacket metal sheet.

Such a steering shaft bearing unit can be produced highly cost-effectively in many different modalities. Nevertheless, the generally posed requirements made of rigidity are readily met by the steering shaft bearing unit.

Especially preferred embodiments of the steering shaft bearing unit according to the invention provide that the jacket metal sheet is formed of a unitary metal sheet. Stated differently, the jacket metal sheet in these variants is formed of a single or single-piece metal sheet. Unitary herein indicates that the metal sheet as such was produced as a part, thus was not assembled or welded together from several metal subsheets. For the production of such a steering shaft bearing unit a preferred method provides that the jacket metal sheet was formed out from one, or a single, unitary metal sheet through reforming, preferably bending. It is especially preferred if it is provided that, following the reforming, preferably bending, opposing front faces of the single-piece metal sheet are connected with one another, preferably welded together or press-fitted, for developing the circumferentially closed region.

An alternative production method for a steering shaft bearing unit according to the invention provides that the jacket metal sheet is produced of a circumferentially closed tubular body thereby that a wall of the tubular body is cut open in the securement region and the freely projecting securement webs and the opening delimited by the securement webs is formed through reforming, preferably recurving, of the regions of the wall delimited through the cutting-open.

Instead of the unitary implementation of the jacket metal sheet, however, the jacket metal sheet can be assembled, preferably welded together, from several sheet metal parts. Thus, methods for the production of a steering shaft bearing unit according to the invention can also be employed in which the jacket metal sheet is assembled, preferably welded together, from several preformed sheet metal parts or reformed sheet metal parts. The jacket metal sheet, be it unitary or assembled from several different metal sheet parts, is advantageously comprised of metal, preferably steel.

Preferred embodiments of the invention provide that the jacket metal sheet comprises at least two circumferentially closed regions each for receiving at least one bearing for the rotatable support of the steering shaft, and that the securement region is disposed between the circumferentially closed regions. Variants that are especially advantageously producible provide that precisely two circumferentially regions each for receiving at least one bearing are involved. The circumferentially closed region(s) of the jacket metal sheet can be implemented tubularly. The jacket metal sheet can comprise only precisely one circumferentially closed region for receiving at least one bearing for the rotatable support of the steering shaft. A second bearing for the steering shaft can in this case be disposed, for example, in a steering power assistance unit or in the bracket part of the steering column.

For the sake of completeness, reference is made to the fact that steering shaft bearing units according to the invention that are especially simply producible provide that the jacket metal sheet comprises in its securement region one of precisely two opposing openings delimited by freely projecting securement webs, wherein these securement webs, in turn, are part of the jacket metal sheet. For additional rigidification of the securement webs it can be provided that the securement webs, preferably at their freely projecting ends, are connected with one another by means of a separate connection metal sheet. Especially preferred variants provide that the connection metal sheet has a V-shaped cross section. The separate connection metal sheet can be secured, for example, by means of welding at the securement webs and in particular at their freely projecting ends. The securement of the separate connection metal sheet at the securement webs, in particular at their freely projecting ends, is preferably carried out in the form of a durable connection. By durable connection is to be understood in principle all types of connections in which it is not intended to implement the connection only temporarily or detachably. In the present, case the connection metal sheet is to be appropriately durably secured, thus over the entire time of use of the steering shaft bearing unit at the securement webs or their freely projection ends. Apart from the welding already mentioned, examples of durable connections are knurling, crimping or press-fitting and the like. A durable clamping-in is also feasible. Stated differently, this durable connection could also be referred to as a permanent connection. The connection metal sheet transmits at least to some extent the pressing forces applied onto the two bearing part beads by the securement device.

The freely projecting securement webs of the jacket metal sheet can each comprise at least one through-opening for guiding through a clamp bolt, known per se, of the steering column. To increase the rigidity of the steering shaft bearing unit in the region of the securement webs, at least one, preferably both, of the securement webs can comprise at least one steering shaft bearing unit bead. Especially preferred embodiments of the invention provide in this context that preferably in each instance the through-opening for guiding through the clamp bolt is disposed in the steering shaft bearing unit. Each freely projecting securement web advantageously comprises precisely on steering shaft bearing unit bead, in each of which one through-opening is disposed. The through-openings are preferably elongated holes. It is furthermore advantageous for the through-opening to be disposed in the bead base of the steering shaft bearing unit. It is especially advantageous for the through-opening to be disposed approximately symmetrically and extending approximately parallel between the side walls or margins delimiting the bead base.

The steering shaft bearing unit beads advantageously involve so-called inner beads. These are characterized thereby that the steering shaft bearing unit bead or beads is or are developed as bead or beads recessed in the direction into an internal volume of the securement region.

Preferred embodiments of the invention provide that the steering shaft bearing unit, preferably the jacket metal sheet, is implemented, at least regionally, preferably entirely, as a single-walled unit. This applies in particular to the securement region but preferably also to the circumferentially closed region for receiving at least one bearing for the rotatable support of the steering shaft.

The jacket metal sheet, or the sheet metal parts from which the jacket metal sheet is formed, are preferably metal sheets. They preferably are comprised of steel, aluminum, magnesium or alloys comprising these metals.

In this context reference should be made to the fact that the through-openings for guiding through the clamp bolt through the securement web(s) and the opening in the securement region of the jacket metal sheet, which is delimited by the at least two opposing, freely projecting securement webs, are cutouts or openings differing from one another. In an especially preferred case, the steering shaft bearing unit comprises precisely two steering shaft bearing unit beads, each of which is disposed in the freely projecting securement regions in the proximity of the free ends.

Apart from the steering shaft bearing unit, the invention also relates to a steering column for a motor vehicle with a bracket part provided for securing the steering column in position on a motor vehicle body, which bracket part comprises at least two side jaws. A steering shaft bearing unit according to the invention is disposed with its securement region between the side jaws and retained on the side jaws by means of the securement webs.

The steering columns according to the invention advantageously involve so-called adjustable steering columns. As is known, these are characterized thereby that the position of the steering shaft including the steering shaft bearing unit is adjustable with respect to the bracket part. The position of the steering wheel can hereby be adapted to the particular driver of the motor vehicle. Especially preferred embodiments of steering columns according to the invention provide that the steering shaft is adjustable in its length direction and/or in a height direction orthogonal to the length direction.

Preferred embodiments of such steering columns provide that, between at least two, preferably precisely two, side jaws of the bracket part provided for the securement of the steering column on a body of a motor vehicle the steering shaft bearing unit for the rotatable support of the steering shaft of the steering column is disposed. In preferred embodiments, a bearing part is disposed between the side jaws of the bracket part and the steering shaft bearing unit. A clamp bolt of the steering column can penetrate the side jaws of the bracket part and the bearing part and the steering shaft bearing unit. The bearing part can herein comprise at least one bearing part bead, and the steering shaft bearing unit can comprise at least one steering shaft bearing unit bead. The bearing part bead is at least regionally areally in contact on the steering shaft bearing unit bead. In such implementations is provided especially preferably for the clamp bolt to penetrate the bearing part in the bearing part bead and the steering shaft bearing unit in the steering shaft bearing unit bead.

The steering column according to the invention can advantageously be implemented such that it can be set in its height, which is identical to inclination, and/or in its length. Preferred are generally cost-effective height- and length-adjustable steering columns which comprise a securement device that makes possible the optional enabling (=open state of the securement device) or fixing (=closed state of the securement device) of the particular displacement direction. As a part of such a securement device, the clamp bolt, together with further clamping parts, such as for example a tightening piece, a cam plate or a clamping nut, can herein serve in simple manner for the optional enabling or fixing of the feasible adjustment in length directions and/or height direction in known manner, depending on the realization. Independently of fixing under form closure or force closure (also friction closure), it is always advantageous for high pressing forces to be applied in the closed state of the securement device onto the connections between steering shaft bearing unit and bearing part, on the one hand, and bearing part and bracket part, on the other hand.

Through the penetration of the clamp bolt through steering shaft bearing unit bead and bearing part bead, the tightening forces exerted by the clamp bolt are directly transmitted to the two listed beads, such that using a simple construction high forces can be transmitted. This also aids in reducing the number of structural parts. In the open state, in which no or only minimal tightening forces are transmitted via the clamp bolt, high rigidity is also attained. The rigidity can herein be further increased if the bearing part and the steering shaft bearing unit on the surfaces oriented parallel to the two side jaws comprise on both sides of the steering shaft correspondingly one steering shaft bearing unit bead and one bearing part bead, which are penetrated by a clamp bolt. This also aids in reducing the number of structural parts and/or the utilization of material for the production of the steering column. In the open state, in which no or only minimal tightening forces are transmitted via the clamp bolt, through the assembly according to the invention a low-play guidance system is attained without large expenditures. To the driver of the motor vehicle consequently in this state also a stable and full sensation is conveyed when handling the steering wheel attached on the steering shaft of the steering column. The bearing part bead and the steering shaft bearing unit bead, as well as a bracket part bead, optionally also provided and discussed below, are advantageously developed such that they correspond to one another. It is in these terms also preferred if the bearing part bead, viewed in a section plane through a longitudinal center axis of the clamp bolt, is developed geometrically similar to the steering shaft bearing unit bead. The same applies advantageously also to a bracket part if such is provided. It is further also advantageous if the bearing part bead and/or the steering shaft bearing unit bead and/or the optionally provided bracket part bead is or are developed axisymmetrically with respect to a longitudinal center axis of the clamp bolt.

It is advantageous if the beads are each in contact, preferably in pairs, with their side walls on one another. However, in order to be able to transmit especially high tightening forces in the axial direction, preferred embodiments of the invention provide that the bearing part bead and the steering shaft bearing unit bead and, if provided, also the bracket part bead comprise each side walls and a bead base connecting the side walls. Especially advantageous is the development of side walls in the particular beads which are inclined in the range of 30° to 60°, preferably 45° to 60°, with respect to the bead base. In the closed state of the securement device, the bearing part bead and the steering shaft bearing unit bead are, preferably pairwise, under prestress in contact on one another with their side walls. The clamp bolt is advantageously guided through an opening in the particular bead base.

The development of the bead base in the bearing part bead as well as also in the steering shaft bearing unit bead oriented parallel, or at least nearly parallel, with respect to one another enables the compensation of tolerances at a simultaneous increase of the contact tension in the contact between the side walls of the two beads. In this case the two bead bases are not in contact on one another in the closed state of the securement device. However, alternatively, it is also conceivable and feasible, with the restriction of the tolerance, to provide this contact between the particular bead bases to be straight or linear, wherein also a considerable pressing force increase onto the contact between the side walls is enabled.

As already addressed, preferred embodiments of the invention provide that each of the side jaws of the bracket part comprises at least one bracket part bead and that the clamp bolt penetrates the side jaws in the bracket part bead and the bracket part bead, preferably on two opposite sides of the clamp bolt, is at least regionally areally in contact on the bearing part bead.

By guiding the clamp bolt through the bearing part bead, the steering shaft bearing unit bead, and optionally also the bracket part bead, a highly compact construction method can be achieved. The clamp bolt can be disposed in close proximity on the steering shaft rotatably supported in the steering shaft bearing unit. This leads to an equally compact as well as also stable construction method. In addition, the forces transmitted via the clamp bolt act very directly onto said beads.

It is advantageously provided that the bolt penetrates centrally the bearing part bead and the steering shaft bearing unit bead as well as the optionally provided bracket part bead, which is further advantageous for a symmetric force introduction distributed over all side walls of the particular beads. The bead base advantageously has a width such that the clamp bolt can be guided completely through an opening in the bead base. The bead base can still comprise further regions lateral to said openings, with which regions it is braced on the bead bases of the other beads. Said openings or cutouts in the beads or bead bases through which the clamp bolt is guided should advantageously be greater than the diameter of the clamp bolt such that the clamp bolt is not in direct contact on the margins of said openings or cutouts. This has, for example, the advantage that in the event of a motor vehicle crash no rotational movement of the clamp bolt is triggered. Moreover, the abrasion in the elongated holes is reduced.

For the sake of completeness, reference is made to the fact that the steering shaft bearing unit bead is a bead in the steering shaft bearing unit, the bearing part bead accordingly is a bead in the bearing part, and the bracket part bead, again, accordingly is a bead in the bracket part. As is generally known, a bead is a channel-like indentation or grooving. Geometrically similar are two beads if they can be transformed one into the other through similarity mapping, e.g. a geometric mapping that can be combined from centric elongations and congruence mapping such as shifting, rotation or mirroring.

It is conceivable and feasible in terms of the invention to implement the beads as so-called inner beads or also as outer beads. The beads are preferably developed as so-called inner beads since in this case a simpler construction leads to a correspondingly stable steering column. Especially preferably by inner bead is to be understood in terms of the invention a bead whose base is recessed approximately perpendicularly to the plane of the side jaws in the direction toward the steering shaft, wherein the base extends substantially parallel to the plane of the side jaws. Hereby a compact construction method is attained. In addition, high forces can also be transmitted. It is consequently advantageous in these terms for the bearing part bead and the steering shaft bearing unit bead and, if provided, also the bracket part bead to be developed as beads recessed in the direction toward the region between the side jaws of the bracket part. In terms of an advantageous force transmission as effective as possible, preferred variants provide furthermore that the bearing part bead on two opposing sides of the clamp bolt is at least regionally areally, or alternatively at least regionally in the form of a line, in contact on the steering shaft bearing unit bead. In terms of low-play guidance and the capability of being able to absorb high forces even in the event of a crash, especially preferred embodiments of the invention provide that the bearing part bead and/or the steering shaft bearing unit bead and/or the optionally provided bracket part bead is or are implemented such that they extend in the longitudinal direction. Hereby is provided an especially great guidance length, and therewith an ideal force bracing under torque loading, such as for example in the event of a crash.

Especially preferred embodiments of the invention provide that the bearing part is formed unitarily, for example of a curved, preferably curved in the shape of a U, strip of sheet metal. In terms of a stable bearing, the bearing part comprises at least two securement sites, spaced apart from one another, at which it can be secured directly or indirectly on the body of the motor vehicle. In these terms, a preferred embodiment of the invention provides that the bearing part comprises at least at one site, spaced apart from the clamp bolt, a bearing part securement forming a fixed securement or a swivel joint for securing the bearing part on the body of the motor vehicle or on the bracket part. The bearing part securement can herein be reinforced or rigidified. In terms of a low-play bearing that is as stable as possible, it is advantageous if the distance between clamp bolt and bearing part securement corresponds at least to half, preferably at least to three-fourths, of the length of the bearing part.

As already stated, preferred variants of the invention are implemented as so-called adjustable steering columns. It can be provided, for example, that the bearing part is swivellably bearing supported to provide height adjustability of the steering column. It can further be provided that the steering shaft bearing unit is displaceably bearing supported in the bearing part to provide length adjustability of the steering column in the longitudinal direction of the steering shaft. Especially preferred embodiments of steering columns according to the invention are height adjustable as well as also length adjustable. They consequently comprise a combination of the last listed features. However, for the sake of completeness reference is made to the fact that the steering columns according to the invention can also be so-called rigid steering columns which lack any of the listed adjustment capabilities.

It must also be taken into consideration that the features of the steering column described with respect to the beads can not only be employed in order to provide an adjustable steering column with as low a play as is possible. Rather, the penetration of said beads by the clamp bolt can also be utilized for the purpose of providing an energy absorption device for said rigid or also adjustable steering column thereby that said beads are implemented as crash beads which are known per se and which are reformed in the event of a crash. In the event of a crash a skidding-through via the bead guidance can be enabled for the energy absorption through the implementation of the beads. In adjustable steering columns, in which said beads are, in addition, also implemented as crash beads, the regions of the beads relevant for the energy conversion in the event of a crash are advantageously located at the end of the displacement path for the steering column adjustment.

BRIEF DESCRIPTION OF THE DRAWINGS

Further features and details of preferred embodiments of the invention will be explained in conjunction with the following description of the drawings, in which.

DETAILED DESCRIPTION OF THE INVENTION

Figure 1:
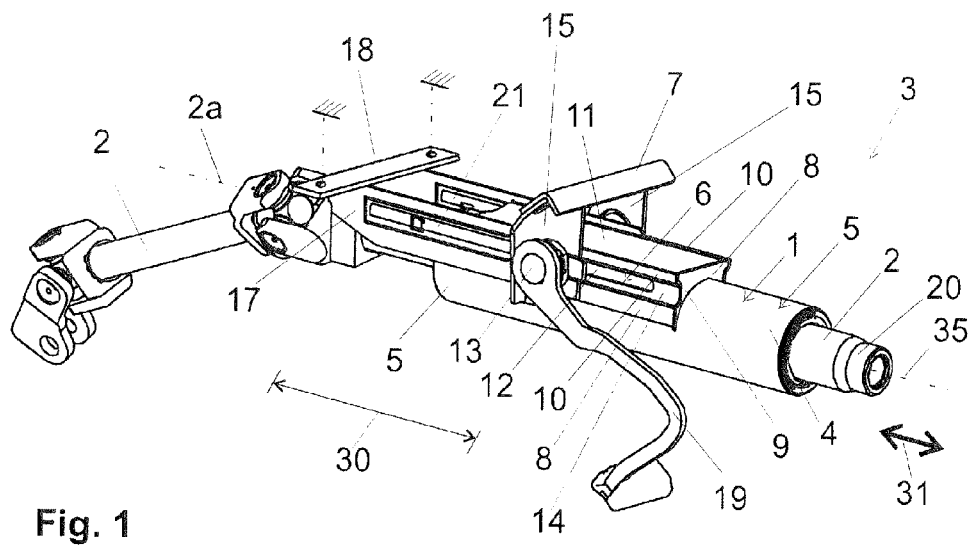
FIGS. 1 and 2 show a first embodiment according to the invention in the form of a length-adjustable steering column.
Figure 2:
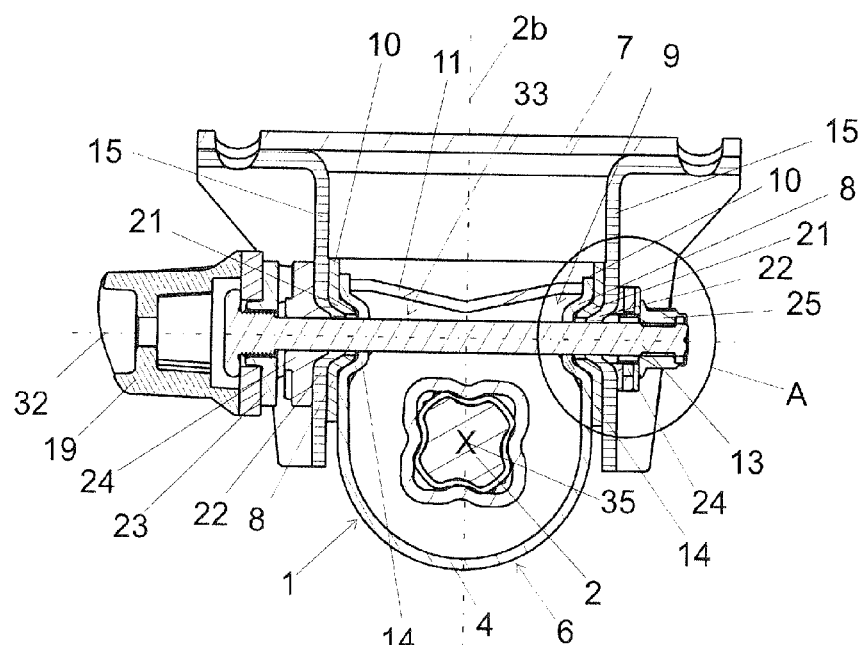

FIG. 1 depicts a first steering column 3 with a steering shaft bearing unit 1 according to the invention. By means of a bracket part 7, it can be secured on a body of a motor vehicle not shown here. FIG. 2 shows a vertical section through this steering column 3 along a clamp bolt 13. In particular FIG. 2 shows especially clearly that the bracket part 7 comprises two side jaws 15 between which the steering shaft bearing unit 1 is retained. In the steering shaft bearing unit 1 is supported the steering shaft 2 such that it is rotatable about its longitudinal axis 35. The steering wheel adapter 20 of the steering shaft 2 is provided for the securement of a steering wheel, not shown here, on the steering shaft 2. Between the side jaws 15 and the steering shaft bearing unit 1 is located the bearing part 17. At the end, facing away from the clamp bolt 13, the bearing part 17 is securable by means of the bearing part securement 18 in the depicted embodiment example on the body, not depicted here, of the motor vehicle. Implementations are also conceivable in which the bearing part securement 18 is secured on the bracket part 7. In the first embodiment example the bearing part securement 18 is implemented rigidly in any case. In the drawing the length of the bearing part 17 is provided with the reference number 30. As explained in the introduction, it is advantageous for the bearing part securement 18 to be as far removed from the clamp bolt 13 as is possible. As already explained, for this purpose the distance between clamp bolt 13 and bearing part securement 18 should be at least half, preferably at least three-fourths, of the length 30 of the bearing part 17.

The depicted embodiment according to FIGS. 1 and 2 involves a length-adjustable steering column 3. The displacement directions are denoted by the double arrow 31. This corresponds to the longitudinal directions of the steering shaft 2.

In order to enable, on the one hand, the displacement in the longitudinal directions 31, and yet to ensure on the other hand, sufficiently strong securement during operation of the steering shaft bearing unit 1 on the bracket part 7, in the case of this steering column, as is known per se, a securement device is provided which, inter alia, encompasses the clamp bolt 13 and the actuation lever 19. It is understood that motor actuations of the securement device are also conceivable. In such cases the actuation lever 19 can be omitted. Securement devices with clamp bolts 13 for adjustable steering columns 3 are known within prior art in a multiplicity of modalities. The embodiments depicted here serve only as an illustration of one of many different possible variants of the manner in which the clamping and release of the securement device can proceed.

In the depicted embodiment, a cam plate 23 is connected torque-proof with the actuation lever 19. The cams of this cam plate 23 cooperate with corresponding countercams of the tightening piece 24. The tightening piece 24 is connected torque-proof with the bracket part 7. On the opposite side the clamp bolt 13 is fixed with a clamping nut 25. Here is also located a tightening piece 24 or an axial bearing which is disposed between the clamping nut 25 and the corresponding side jaw 15 of the bracket part 7. By turning the actuation lever 19 about the center longitudinal axis 32 of the clamp bolt 13, the cam plate 23 is turned against the adjacently disposed tightening piece 24. Depending on the position of the involved cams with respect to one another, the securement device is subsequently in the closed state in which the steering shaft bearing unit 1 is fixed, at least under the forces occurring in normal operation, on the bracket piece 7. Through the appropriate rotation of the actuation lever 19 the securement device can subsequently be brought into the open state in which a displacement is enabled in the longitudinal directions 31 of the steering shaft bearing unit 1, relative to the bracket part 7, and therewith a setting of the position of the steering wheel. Such securement devices are known per se and do not need to be further explained here.

As is especially clearly evident in the sectional representation according to FIG. 2, both, the bearing part 17 as well as also the steering shaft bearing unit 1 comprise beads with which they are supported one in the other. In the first embodiment, the particular bearing part bead 21 is guided in one of the steering shaft bearing unit beads 14. In the depicted first embodiment, according to FIGS. 1 and 2 the bracket part 7 additionally also comprises at both side jaws 15 one bracket part bead 22 which, in the depicted embodiment, engages into one of the bearing part beads 21. The clamp bolt 13 is guided through the bearing part beads 21 and the steering shaft bearing unit beads 14. In the depicted embodiment, it is additionally also guided through the bracket part beads 22. It is conceivable and feasible, even in steering columns 3 which are only adjustable in length, to omit bracket part bead 22. The side jaws 15 are in that case preferably implemented planarly in the proximity of the tightening and displacement, at least in the surface directed toward the steering shaft bearing unit.

As can be seen especially well in FIG. 2, it is advantageous if, as in this embodiment also realized, the beads are implemented as so-called inner beads. This is the case if they are implemented such that they are recessed in the direction into the region 33 between the side jaws 15 of the bracket part 7 or in the direction into the interior volume of the securement region 6 forming the region 33.

Figure 10:
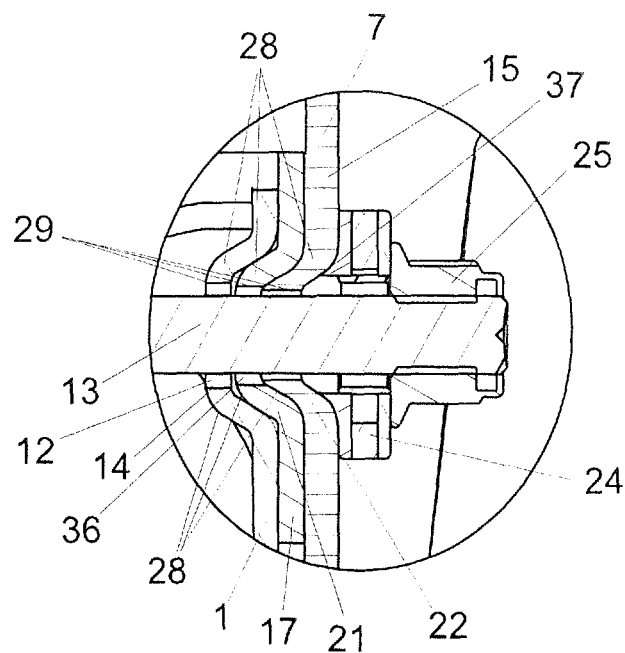
FIG. 10 shows the region A from FIG. 2.

Region A from FIG. 2 is once again depicted in FIG. 10 as an enlargement. It can here be seen especially well that each of the beads 14, 21 and 22 comprises two side jaws 28 which are connected with one another by means of a bead base 29. The clamp bolt 13 penetrates in each instance the bead base 29 of said beads 14, 21 and 22. The cutout or opening necessary for this purpose is advantageously only large enough for there still to be lateral margins of the bead base 29. This enables greater rigidity in the contact of the bearing part bead 21 on the particular steering shaft bearing unit bead 14 since thereby, in the direction of the center longitudinal axis 32 of the clamp bolt 13, forces can be transmitted especially well. The side walls 28, and here also the bead bases 29 of the beads 14, 21 and 22 located adjacently, are fully in areal contact on one another. They are symmetric with respect to the center longitudinal axis 32 of clamp bolt 13 and, in terms of optimal contact on one another, have a geometrically similar form. In the first embodiment example according to FIGS. 1 and 2 the tightening pieces 24, engaging from the outside into the bracket part beads 22, comprise projections formed out corresponding to the bead indentation with which they engage into the bracket part beads 22. By guiding the clamp bolt 13 directly through the beads 14, 21 and here also 22, the clamping forces of the clamp bolt 13 act directly onto said beads whereby a simple as well as also effective construction method and force transmission is realized.

The through-opening 12, or the elongated hole forming it, is advantageously wider in the steering shaft bearing unit 1 than the diameter of hole 36 in the bearing part 17. The diameter of hole 37 in the bracket part 7 is advantageously smaller than the diameter of hole 36 in the bearing part 17. In this way the abrasion can be reduced. It is also conceivable and feasible for the production of a greater displacement length to implement the hole 36 as an elongated hole. In that case, instead of the diameter of hole 36, the width of the elongated hole would have to be assessed as the measure of the above comparisons.

In general, reference should be made to the fact that through the construction according to the invention a highly compact construction method is made possible thereby that the spacing between the clamp bolt 13 and the steering shaft 2 can be kept very low.

The steering shaft bearing unit beads 14 in the first embodiment example comprise each an elongated hole as the through-openings 12 through which the clamp bolt 13 is guided. Through these elongated holes extending longitudinally in the longitudinal direction 31 of the steering shaft 2 it becomes feasible to displace the steering shaft bearing unit 1 in the longitudinal directions 31 relative to the bracket part 7.

The bearing part beads 21 and the bracket part beads 22 do not need to be implemented such that they extend longitudinally. Through the longitudinal extent of the bearing part 17 over its length 30 and the disposition of the bearing part securement 18, remote from the clamp bolt 13 in the longitudinal direction 31, a highly torsion-resistant and low-play bearing of the steering shaft bearing unit 1 is attained. Yet the torsion resistance of the construction, however, can be still further increased thereby that, as realized in the first embodiment example, the bearing part beads 21 also are longitudinally extended. The engagement of the bearing part beads 21 into the steering shaft bearing unit beads 14 is thereby, as realized in the first embodiment example, markedly extended in the longitudinal direction 31 which further increases the torsion resistance of the overall construction.

Figure 3:
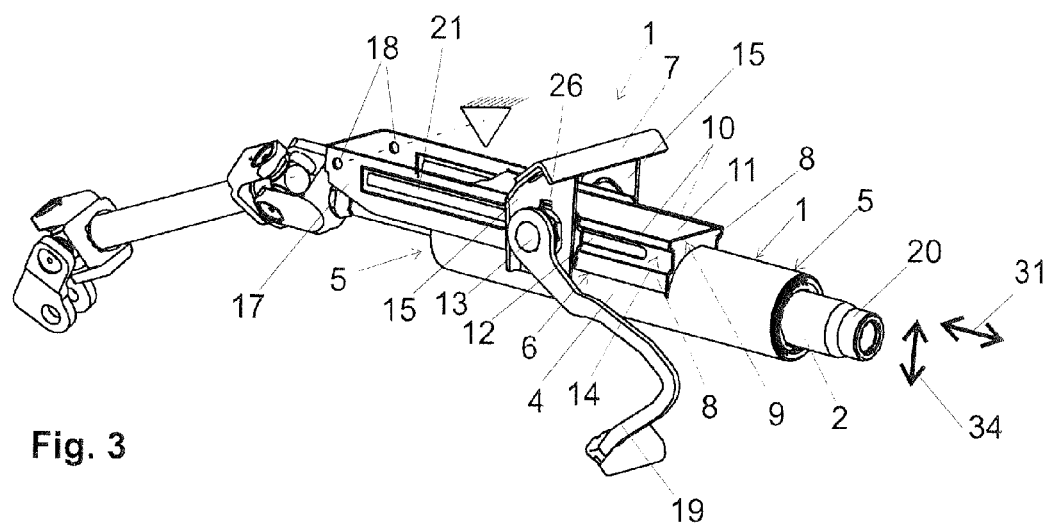
FIGS. 3 and 4 show a second steering column implemented according to the invention, which is height- and length-adjustable.
Figure 4:
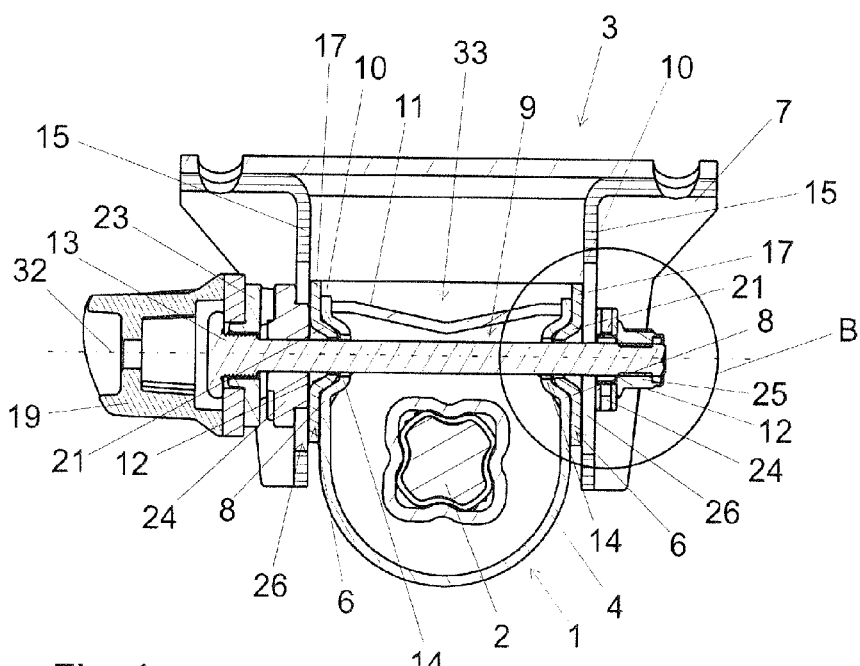

Before discussing the embodiment according to FIGS. 3 and 4, reference should be made to the fact that in all of the depicted embodiments, the particular bead configurations are realized bilaterally, thus on both side jaws 15 of the bracket part 7. This is advantageous in terms of a low-play rigid structure. However, it is not absolutely necessary. It would also be conceivable to realize the corresponding bead configurations in the region of only one of the side jaws 15.

In the embodiment according to FIGS. 3 and 4, in addition to the length adjustability of the steering column 3 in the longitudinal directions 31, a height adjustability of this steering column 3 or its steering shaft 2 in the height directions 34 is provided. For this purpose, in both side jaws 15 of the bracket part 7 in this embodiment a vertically extending elongated hole 26 is disposed in which the clamp bolt 13 is disposed such that it is longitudinally displaceable. Height as well as also length adjustment, however, are only possible when the securement device is in its open state. In the closed state of the securement device these adjustment capabilities are not given at least not under the forces occurring during normal operation.

Figure 11:
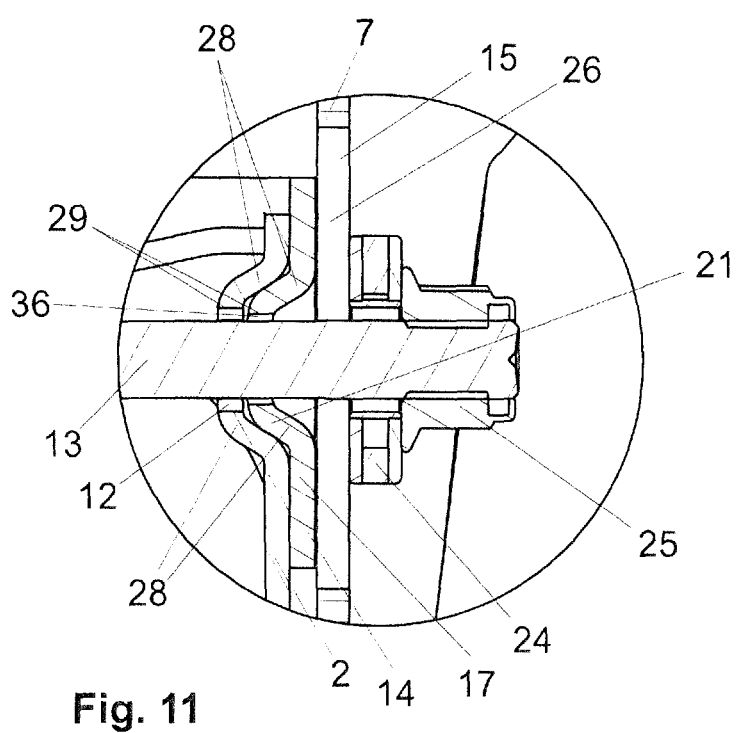
FIG. 11 shows the region B from FIG. 4.

In order to be able to realize the height adjustability in the height directions 34 also, in the embodiment according to FIGS. 3 and 4 the bearing part securement 18 of bearing part 17 comprises a swivel joint. The bearing part 17, together with the steering shaft bearing unit 1, can be swivelled about this swivel joint of the bearing part securement 18 when a height adjustment is carried out. A further difference from the first embodiment example comprises that in this variant a bracket part bead is omitted on both side jaws 15. Said elongated holes 26 are provided in the side jaws 15 on both sides. The tightening pieces 24 in this embodiment example also do not comprise noses with which they would engage into the beads. It is nevertheless provided that the bearing part beads 21 are in contact in the steering shaft bearing unit beads 14 and that the clamp bolt 13 penetrates through these beads. All of this is once again shown in FIG. 11 at an enlargement by depicting in this Figure the detail B from FIG. 4. As far as applicable, the description provided in conjunction with FIG. 10 applies to this Figure also with the exception of the differences already stated.

Apart from said differences, the embodiment example according to FIGS. 3 and 4 is substantially implemented like the first embodiment example such that additional explanations in this regard are not necessary.

Figure 5:
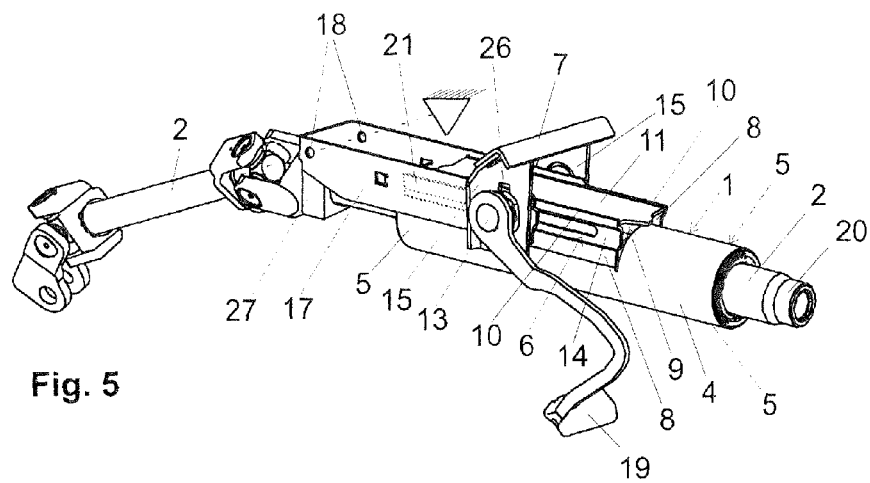
FIG. 5 shows a modification of the second embodiment according to the invention.

In general, reference is to be made to the fact that the steering shaft 2, as a rule, is preferably twice rotatably supported by means of bearings at two sites, spaced apart from each other, of the steering shaft bearing unit 1, here in the circumferentially closed regions 5 of the jacket metal sheet 4, which bearings are here not explicitly drawn but are known per se. In the modified variant of the embodiment example according to FIGS. 3 and 4 depicted in FIG. 5, a steering shaft bearing 27 is additionally provided at the motor-side end of the bearing part 17. In all other regards this embodiment example according to FIG. 5 corresponds to the variant according to FIGS. 3 and 4.

Figure 6:
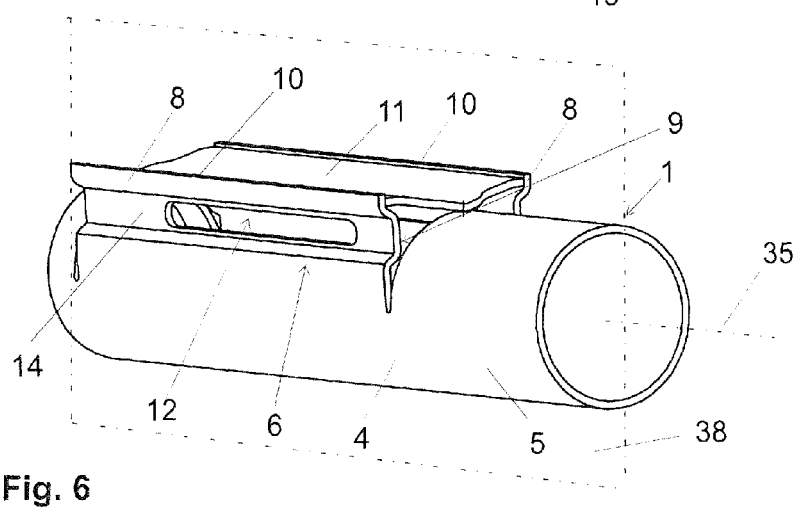
FIG. 6 shows a first steering shaft bearing unit implemented according to the invention, such as can be employed in the steering columns according to FIGS. 1 to 5.

In FIG. 6 is depicted an example of a steering shaft bearing unit 1 implemented according to the invention from the jacket metal sheet 4, such as can be employed in the embodiment variants of the steering column 3 according to FIGS. 1 to 5, however also in other embodiments according to the invention. In the variant depicted in FIG. 6 the jacket metal sheet 4 is formed from a unitary metal sheet and implemented as a single-wall jacket. The two ends of the jacket metal sheet 4, viewed in the longitudinal direction, are developed as circumferentially closed regions 5 for receiving at least one bearing each for the rotatable support of the steering shaft 2. Alternatively, it is also conceivable and feasible to provide only one circumferentially closed region 5 for receiving at least one bearing of the steering shaft 2. Such steering shaft bearing units are applicable, for example if the second bearing of the steering shaft is produced directly on the motor vehicle body or in another device, for example, a power assistance device for a power steering. Between them is located the securement region 6 in which an opening 9, delimited by two opposing, freely projecting securement webs, is provided. Generally speaking, it is advantageous if the opening 9, viewed in the circumferential direction, extends over at least 10%, preferably at least over 20%, of the outer circumference of the jacket metal sheet 4 in the securement region 6. The securement webs 8 are here unitary parts of the jacket metal sheet 4. For the rigidification of the securement webs 8, as also realized in FIG. 6, a separate connection metal sheet 11 can be provided for connecting the securement webs 8. The connection metal sheet 11 advantageously connects the securement webs at their freely projecting ends 10. As can be seen especially clearly in FIGS. 2 and 4, this connection metal sheet 11 advantageously has a V-shaped cross section. The recurvature site of the V-shaped cross section advantageously extends in longitudinal directions 31. The recurvature site (=tip of the V shape) of the V-shaped cross section advantageously extends in a plane of symmetry 38 of the securement region 6. In this plane of symmetry 38 also extends preferably the longitudinal axis 35 of the steering shaft 2 about which axis the steering shaft 2 is rotatably supported in the steering shaft bearing unit 1. However, it is also conceivable and feasible for the connection metal sheet to be implemented in the shape of a W. The faces forming the V or the W can herein also be implemented arcuately.

Figures 7, 8, 9:
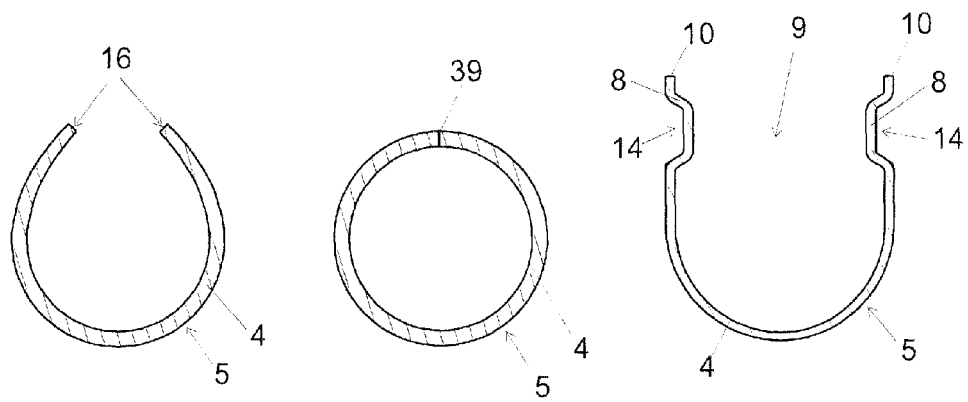
FIGS. 7 to 9 show different sectional depictions of the steering shaft bearing unit according to FIG. 6

The jacket metal sheet 4 depicted in FIG. 6 can be produced using the methods described in the introduction. It is, for example, feasible that a stamped and shaped unitary sheet metal part is initially bent open in the shape of a U. During the cutting-to-size of this sheet metal part, carried out before the bending, only very minimal cutting scrap, if any, is generated. The regions 5 that will later be circumferentially closed, are further deformed or rolled adjoining the U-shaped bending until they abut one another with their front faces 16 and consequently provide a circumferentially closed, preferably tubular, bearing seat. The front faces 16 can subsequently be welded together or press-fitted with one another at corresponding sites in the circumferentially closed regions 5 at the welding seam 39. A post-calibration of the bearing seat can optionally be carried out in these regions 5. FIG. 7 shows a section through the jacket metal sheet 4 in one of the regions 5 before the front-face ends 16 are completely bent into the state in which they are in contact on one another. FIG. 8 shows this region 5 in the final realization in which it is circumferentially closed and here is implemented tubularly. For the sake of completeness, reference is made to the fact that the jacket metal sheet 4 in the circumferentially closed regions 5 does not absolutely have to be tubular or have an annular cross section. Polygonal or other geometric shapes are also conceivable.

FIG. 9 shows a section through the jacket metal sheet in the securement region 6. Here the securement webs 8 are formed out with their freely projecting ends 10. In the depicted embodiment example both securement webs 8 comprise each a steering shaft bearing unit bead 14. The particular freely projecting securement webs 8 delimit the opening 9. To rigidify the securement region 6, the connection metal sheet 11 can be inserted between the securement webs 8 and here, for example, be welded on. It is especially preferred for the connection metal sheet 11 to be attached on the freely projecting ends 10 of the securement webs 8. The separately inserted connection metal sheet 11 can be attached very closely to the clamp bolt 13 if there are no beads, even directly tangentially on opening 9. This ensures high tightening force transmission with relatively minor elastic deformation in the securement region 6.

Alternatively, as already explained, for the production of the steering shaft bearing unit 1 it can also be provided that the jacket metal sheet 4 is produced of a circumferentially closed tubular body thereby that a wall of the tubular body is cut open in the securement region 6 and the freely projecting securement webs 8 and the opening 9 delimited by the securement webs is produced through reforming, preferably bending, of the regions of the wall delimited by the cutting-open. This can also be explained in conjunction with FIGS. 7 to 9. In contrast to the above description, the starting point is a circumferentially closed tube. In regions 5, in which the bearing for the support of the steering shaft 2 is to be disposed, this tube potentially no longer needs to be worked further. To develop the securement region 6, the initially circumferentially closed tube or its wall, depicted in FIG. 8, is cut open. Such a cut could take place, for example, at the site at which in FIG. 8 the welding seam 39 is drawn. As shown in FIG. 7, the securement webs 8 would subsequently have to be produced by reforming, in particular by bending, of the regions of the wall delimited by the cutting-open. Simultaneously, or subsequently, through the corresponding reforming or working processes, the steering shaft bearing unit beads 14 and through-openings 12, also depicted in FIG. 9, could be worked in.

As already explained in the introduction, alternatively to the unitary forming-out of the jacket metal sheet 4, it can also be provided that the jacket metal sheet 4 is assembled, preferably welded together, from several sheet metal parts, in particular extruded profiles or reformed sheet metal parts. Assembling the jacket metal sheet from several sheet metal parts is shown by example in FIG. 12. Here a section, otherwise similar to FIG. 9, through the securement region 6 is shown. However, initially two reformed sheet metal parts separate from one another are here provided, which are connected with one another at the corresponding front faces 40, for example by welding.

Figure 12:
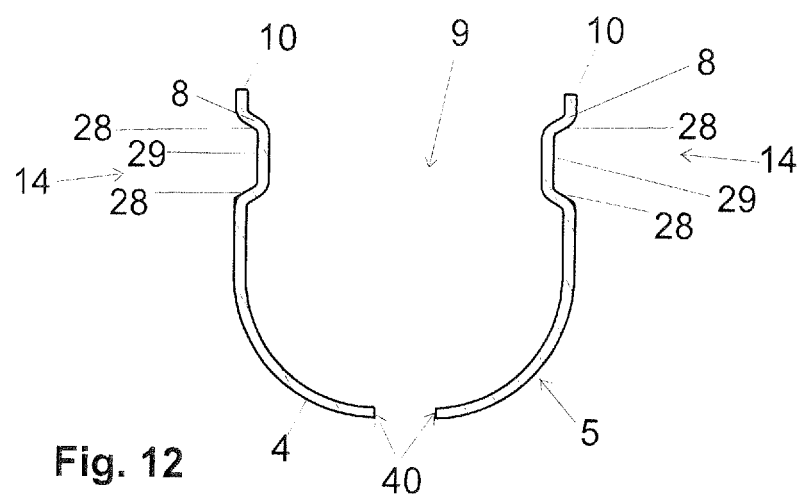
FIG. 12 shows an example of the manner in which the jacket metal sheet in the securement region can be assembled from two reformed sheet metal parts.

FIG. 12 consequently illustrates a further production technology for the steering shaft bearing unit. It is accordingly also conceivable and feasible to fabricate the entire steering shaft bearing unit from two half shells, wherein the half shells extend over the future securement region 6 as well as also over the region(s) 5. In a first step, for this purpose two sheet metal parts are formed which immediately after the joining form the entire steering shaft bearing unit such as is depicted in FIG. 6. The half shells are for this purpose connected with one another preferably along the plane of symmetry 38. The separate connection metal sheet 11 is subsequently appropriately inserted to form the steering shaft bearing unit 1 according to the invention. Precisely such a technology is well suited for the production of the steering shaft bearing unit from a compound material, for example carbon fiber composite material of prefabricated plates.

For the welding can be employed classic welding methods, such as orbital friction welding or, in particular, also laser welding. Corresponding guidance profile forms for the sheet metal parts can be produced according to methods of prior art.

The implementation using several assembled sheet metal parts entails the advantage that the structural parts can be implemented more appropriately for fabrication or for interface considerations. In particular, it is in this case especially simply feasible to provide at different sites different wall thicknesses in simple manner. For example, the circumferentially closed regions 5 for the bearing of the steering shaft can in this case be developed with thinner walls than the securement region 6. It is also feasible for the profile form in regions 5 to be round on the inside and polygonal on the outside in order to enable a simple installation into the body of different motor vehicles.

Figure 13:
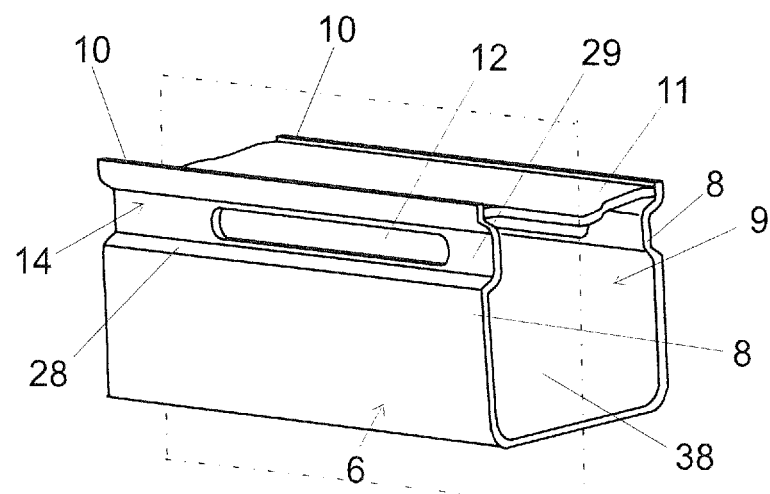
FIG. 13 an alternative embodiment of the securement region of the jacket metal sheet.
Figure 14:
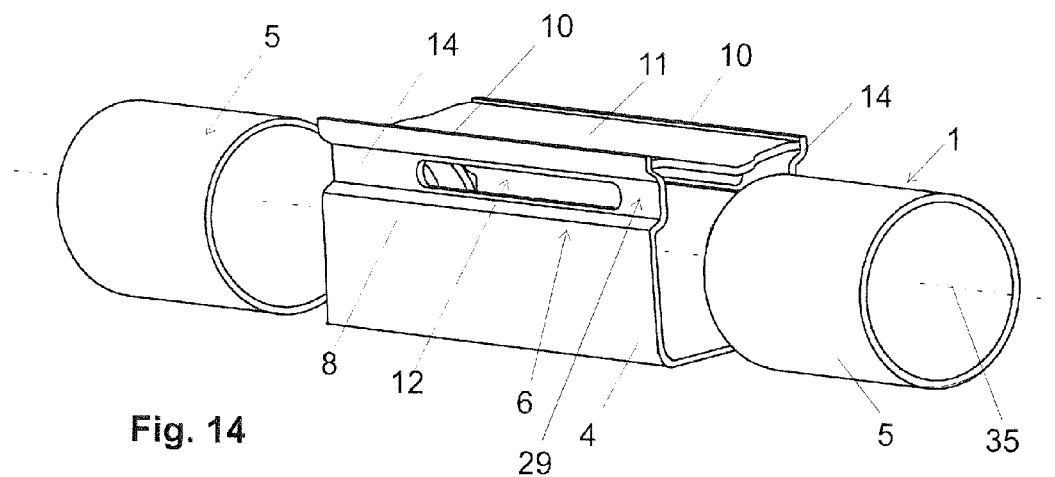
FIGS. 14 and 15 are depictions of a second steering shaft bearing unit implemented according to the invention, such as can be employed in the steering columns according to FIGS. 1 to 5, utilizing a securement region 6 according to FIG. 13.
Figure 15:
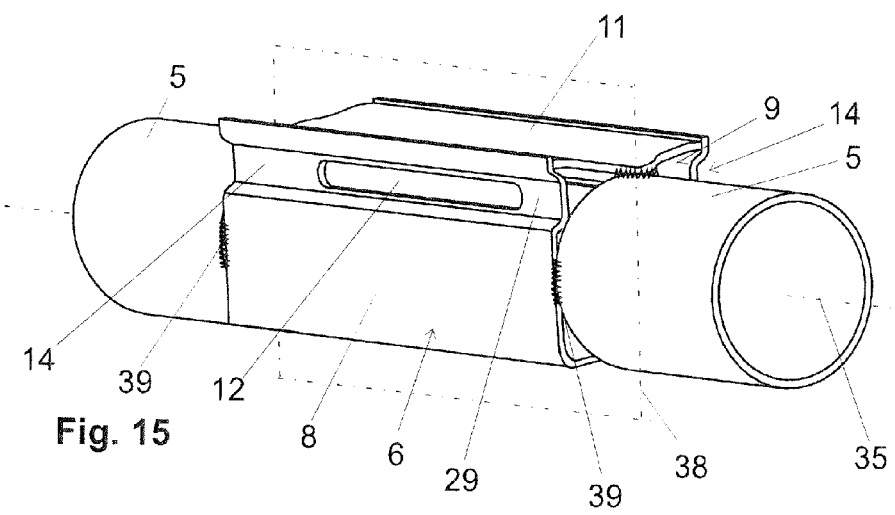

In conjunction with FIGS. 13 to 15 yet a further embodiment of the invention is shown by example, in which the jacket metal sheet is assembled, preferably by welding, from several sheet metal parts. The embodiment variant according to the invention shown by example in conjunction with FIGS. 13 to 15, provides that the securement region 6 and the circumferentially closed region 5 or the circumferentially closed regions 5 are implemented as initially separate structural parts and subsequently are preferably directly connected, preferably by welding. Stated differently, it is in these variants provided that the securement region 6 is fabricated as a separate structural part which is joined with at least one region 5 for receiving at least one bearing for the rotatable support of the steering shaft 2 in order to form in this manner the steering shaft bearing unit 1. In these variants can be provided that the securement region 6 is implemented unitarily, preferably of precisely one extruded profile or reformed sheet metal part. However, it is also equally well feasible for the securement region 6 to be assembled, preferably using welding, from several parts, preferably from several extruded profiles or reformed sheet metal parts. In this embodiment example the jacket metal sheet 4 or the steering shaft bearing unit 1 generated therefrom is developed as a single-wall unit. In preferred variants there are not found at any site double or multiple walls. FIG. 13 shows the securement region 6. This is formed from two sheet metal parts in the depicted embodiment. From the one sheet metal part through reforming the securement webs 8 and the section connecting them of the jacket metal sheet 4 are formed. The second sheet metal part is formed by the separate connection metal sheet 11 with its V-shaped cross section, as has already been described in context with the preceding embodiments. Through the insertion of the separate connection metal sheet 11 between the securement webs 8 at their freely projecting ends 10, the opening 9 is delimited upwardly. The securement region 6 developed in this manner can subsequently in the depicted embodiment be connected with two circumferentially closed regions 5 for receiving the bearing for the support of the steering shaft 2. FIG. 14 shows the state before the connection or before the joining of regions 5 with the securement region 6. FIG. 15 shows the final product in which the regions 5 are fixed on the prefabricated securement region 6, here by means of welding seam 39. It is here consequently also provided that the jacket metal sheet 4 comprises at least two circumferentially closed regions 5 for receiving at least one bearing each for the rotatable support of the steering shaft 2 and that the securement region 6 is disposed between the circumferentially closed regions 5. The steering shaft bearing unit 1 developed thus can also be employed in the steering columns 3, such as are shown in FIGS. 1 to 5, or also in other embodiments of a steering column 3 according to the invention.

Whenever in the preceding description sheet metal is listed as the material, it should be noted that the structural parts or the intermediate forms can be fabricated for example of sheet steel, sheet aluminum, or sheet magnesium, however also of carbon fiber composite materials or other compound materials. Instead of metal sheets, cast parts can also be employed as preshapes or finished parts. It is also conceivable and feasible to employ a mixture of different materials and different production methods for the preshaped parts for the production of the steering shaft bearing unit. The term 'metal sheet' and in particular that of 'jacket metal sheet 4', in terms of a jacket, is also to be interpreted accordingly broadly in terms of a wall or of a jacket and is by no means limited to metallic sheets or sheets of pure metals.

To the extent applicable, all features depicted in the individual embodiments are freely combinable with one another without leaving the scope of the invention.

LEGEND TO THE REFERENCE NUMBERS

1 Steering shaft bearing unit
2 Steering shaft
3 Steering column
4 Jacket metal sheet
5 Circumferentially closed region 35
6 Securement region
7 Bracket part
8 Securement web
9 Opening
10 Freely projecting end
11 Separate metal sheet
12 Through-opening
13 Clamp bolt
14 Steering shaft bearing unit bead
15 Side jaw
16 Front face
17 Bearing part
18 Bearing part securement
19 Actuation lever
20 Steering wheel adapter
21 Bearing part bead
22 Bracket part bead
23 Cam plate
24 Tightening piece
25 Clamping nut
26 Elongated hole
27 Steering shaft bearing
28 Side wall
29 Bead base
30 Length
31 Longitudinal directions
32 Center longitudinal axis
33 Region
34 Height directions
35 Longitudinal axis
36 Hole
37 Hole
38 Plane of symmetry
39 Welding seam
40 Front faces

The invention claimed is:

1. A steering shaft bearing unit for rotatably supporting a steering shaft of a steering column for a motor vehicle, comprising:
a jacket metal sheet including a circumferentially closed region for receiving at least one bearing for rotatably supporting the steering shaft; and
a securement region for securing said steering shaft bearing unit on a bracket part of the steering column, said jacket metal sheet including an opening in the securement region, said opening being delimited by at least two opposing freely projecting securement webs, said securement webs being part of said jacket metal sheet;

wherein at least one of said securement webs comprises at least one steering shaft bearing unit inner bead, and each of said securement webs has at least one through-opening for guiding a clamp bolt of the steering column through said securement webs, said through-opening for guiding the clamp bolt being disposed in said at least one steering shaft bearing unit inner bead of said at least one of said securement webs.

2. The steering shaft bearing unit as in claim 1, wherein said securement webs are connected by a separate connection metal sheet.

3. The steering shaft bearing unit as in claim 2, wherein said connection metal sheet has a V-shaped cross section.

4. The steering shaft bearing unit as in claim 3, wherein said securement webs are connected at freely projecting ends of said securement webs.

5. The steering shaft bearing unit as in claim 1, wherein said jacket metal sheet is formed from a unitary metal sheet.

6. The steering shaft bearing unit as in claim 1, wherein said jacket metal sheet is formed of a plurality of sheet metal parts.

7. The steering shaft bearing unit as in claim 6, wherein said jacket metal sheet is formed of said plurality of sheet metal parts welded-together.

8. The steering shaft bearing unit as in claim 1, wherein said jacket metal sheet comprises at least two circumferentially closed regions each receiving at least one bearing for rotatably supporting the steering shaft, and said securement region is disposed between said at least two circumferentially closed regions.

9. The steering shaft bearing unit as in claim 1, wherein each of said securement webs comprises at least one steering shaft bearing unit inner bead.

10. A steering column for a motor vehicle, comprising:
a bracket part for securing said steering column to a body of a motor vehicle, said bracket part including at least two side jaws; and
said steering shaft bearing unit as in claim 1 disposed such that said securement region is between said at least two side jaws and is retained on said at least two side jaws by said securement webs.

11. A method of producing said steering shaft bearing unit as in claim 1, comprising forming said jacket metal sheet from a unitary metal sheet by reforming.

12. The method as in claim 11, wherein said forming of said jacket metal sheet by reforming comprises forming said jacket metal sheet from a unitary metal sheet by bending.

13. The method as in claim 11, further comprising connecting opposing front faces of the unitary metal sheet subsequent to said reforming to form said circumferentially closed region.

14. The method as in claim 13, wherein said forming of said jacket metal sheet by reforming comprises forming said jacket metal sheet from a unitary metal sheet by bending.

15. The method as in claim 14, wherein said connecting of the opposing front faces of the unitary metal sheet subsequent to said bending comprises welding or press-fitting the opposing front faces of the unitary metal sheet subsequent to said bending to form said circumferentially closed region.

16. A method of producing said steering shaft bearing unit as in claim 1, comprising forming said jacket metal sheet from several preformed sheet metal parts.

17. The method as in claim 16, further comprising welding together said jacket metal sheet from several preformed sheet metal parts.

18. A method of producing said steering shaft bearing unit as in claim 1, comprising:
producing said jacket metal sheet from a circumferentially closed tubular body such that one wall of the tubular body is cut open in said securement region; and
developing said securement webs and said opening by reforming of regions of the one wall delimited by said cutting open.

19. The method as in claim 18, wherein said developing of said securement webs and said opening by reforming comprises recurving of the regions of the one wall.

* * * * *